United States Patent [19]

Shimatani et al.

[11] Patent Number: 5,776,613
[45] Date of Patent: Jul. 7, 1998

[54] ENAMEL FRIT COMPOSITION FOR A LOW-EXPANSION CRYSTALLIZED GLASS AND ENAMEL-COATED LOW-EXPANSION CRYSTALLIZED GLASS PLATE USING THE SAME

[75] Inventors: Narutoshi Shimatani; Kiyoshi Katagi; Akihiko Sakamoto, all of Shiga-ken, Japan

[73] Assignee: Nippon Electric Glass Co. Ltd., Shiga-ken, Japan

[21] Appl. No.: 740,626

[22] Filed: Oct. 31, 1996

[51] Int. Cl.⁶ ........................ B32B 17/06
[52] U.S. Cl. .................. 428/427; 428/428; 428/432; 501/4
[58] Field of Search .............. 501/17, 18, 21, 501/32, 4; 428/428, 432, 427

[56] References Cited

U.S. PATENT DOCUMENTS

| | | | |
|---|---|---|---|
| 4,057,670 | 11/1977 | Scheidler | 428/189 |
| 4,158,081 | 6/1979 | Wexell | 428/212 |
| 4,835,121 | 5/1989 | Shibuya et al. | 501/4 |
| 5,137,779 | 8/1992 | Hing | 428/336 |
| 5,326,728 | 7/1994 | Boury et al. | 501/17 |
| 5,385,871 | 1/1995 | Nigrin et al. | 501/25 |

FOREIGN PATENT DOCUMENTS

| | | |
|---|---|---|
| 3229838 | 2/1984 | Germany . |
| 0240720 | 10/1987 | Germany . |
| 0336797 | 10/1930 | United Kingdom . |
| 2263478 | 7/1993 | United Kingdom . |

*Primary Examiner*—Timothy M. Speer
*Attorney, Agent, or Firm*—Hopgood, Calimafde, Kalil & Judlowe

[57] ABSTRACT

In order to provide an enamel frit composition capable of preventing a hue of a low-expansion crystallized glass plate of a dark color from being seen through an enamel coating without increasing the thickness of the enamel coating and the mixing ratio of a coloring pigment as well as to provide an enamel-coated low-expansion crystallized glass plate using the above-mentioned composition, the enamel frit composition for a low-expansion crystallized glass essentially consists, by weight, of 30–94 wt % glass powder, 5–69 wt % $TiO_2$ powder, and 0.05–34 wt % coloring pigment.

4 Claims, No Drawings

ENAMEL FRIT COMPOSITION FOR A LOW-EXPANSION CRYSTALLIZED GLASS AND ENAMEL-COATED LOW-EXPANSION CRYSTALLIZED GLASS PLATE USING THE SAME

BACKGROUND OF THE INVENTION

This invention relates to a low-expansion crystallized glass plate and, in particular, to a low-expansion crystallized glass plate for use as a top plate of an electric cooker with a heat source such as a halogen heater.

This invention also relates to an enamel frit composition for the above-mentioned low-expansion crystallized glass plate.

Recently, there is an increasing demand for an electric cooker with a heat source such as a halogen heater because of its safety. As a top plate of the electric cooker, use is generally made of a low-expansion crystallized glass plate having a coefficient of thermal expansion of about $(-5)$–$30 \times 10^{-7}/°C$. within a temperature range between $30°$ and $750°$ C.

In Japanese Unexamined Patent Publication No. 62-182135 (JP-A-62182135), corresponding to U.S. Pat. No. 4,835,121, there is disclosed a low-expansion crystallized glass for use as such a top plate. The glass consists, by weight, of 60–72% $SiO_2$, 14–28% $Al_2O_3$, 2.5–5.5% $Li_2O$, 0.1–0.9% MgO, 0.1–0.9% ZnO, 3–6% $TiO_2$, 0.03–0.5% $V_2O_5$, 0.1–1% $Na_2O$, 0–1% $K_2O$, 0–2% CaO, 0–2% BaO, 0–2% PbO, 0–2% $As_2O_3$, 0–3% $ZrO_2$, and 0–3% $P_2O_5$. The glass contains precipitated solid solution crystals of β-quartz and has a black appearance.

Such a low-expansion crystallized glass plate of a dark color is not only excellent in strength and thermal shock resistance, but has high infrared ray transmittance and low transmittance for a visible light. Accordingly, when the heat source is operated, the heat source can be confirmed through the top plate. On the other hand, when the heat source is not operated, the top plate becomes opaque so that the heat source is not seen.

In order to paint a surface of the low-expansion crystallized glass plate of the type described, use has widely been made of an enamel frit composition which comprises glass powder typically used as an enamel for a ceramic article, and a coloring pigment. An enamel coating is produced by mixing the glass powder and the coloring pigment to form a paste, applying the paste on the surface of the crystallized glass plate by screen printing, and baking the paste at a predetermined temperature.

In recent years, a light color such as beige is preferred as a hue of an external plate and a frame of a cooker. In order to harmonize the hue, it is desired that the enamel coating of the top plate has a light color.

However, in case where the enamel coating of such a light color is formed on the surface of the above-mentioned low-expansion crystallized glass plate of a dark color, it is difficult to obtain a desired hue because the hue of the crystallized glass plate is seen through the enamel coating.

In order to avoid that the hue of the low-expansion crystallized glass plate of a dark color is seen through the enamel coating, the thickness of the enamel coating is increased and/or the coloring pigment is mixed at a high mixing ratio. However, such approach causes various problems.

Specifically, when the thickness of the enamel coating is increased, abrasion resistance is deteriorated. Accordingly, when the cooker is used, the enamel coating is easily damaged by friction with a pan or pot. Furthermore, if there is a large difference in the coefficient of thermal expansion between the low-expansion crystallized glass plate and the enamel coating, an increase in thickness of the enamel coating results in frequent occurrence of cracks or peel-off and is therefore unfavorable.

On the other hand, in case where the coloring pigment is mixed at a high mixing ratio, the abrasion resistance of the enamel coating is deteriorated and the acid resistance is also decreased. While the cooker is used for a long period of time, the enamel coating is readily damaged, for example, by spilling of food during boiling.

SUMMARY OF THE INVENTION

It is an object of the present invention to provide an enamel frit composition which is capable of preventing a hue of a low-expansion crystallized glass plate of a dark color from being seen through an enamel coating of a light color without increasing the thickness of the enamel coating or the mixing ratio of a coloring pigment.

It is another object of the present invention to provide an enamel-coated low-expansion crystallized glass plate using the above-mentioned enamel frit composition.

According to an aspect of the present invention, there is provided an enamel frit composition for a low-expansion crystallized glass essentially consisting of 30–94 wt % glass powder, 5–69 wt % $TiO_2$ powder, and 0.05–34 wt % coloring pigment.

According to another aspect of the present invention, there is provided an enamel-coated low-expansion crystallized glass plate comprising a low-expansion crystallized glass plate covered with an enamel coating essentially consisting of 30–94 wt % glass component, 5–69% $TiO_2$ crystal, and 0.05–34% coloring pigment.

DESCRIPTION OF PREFERRED EMBODIMENT

An enamel frit composition according to the present invention comprises $TiO_2$ powder added to glass powder and a coloring pigment and is therefore improved in concealability or non-transmittance for a visible light. Accordingly, even when the enamel frit composition of a light color is prepared and applied as an enamel coating onto a surface of a low-expansion crystallized glass plate of a dark color, a hue of the crystallized glass plate is not seen through the enamel coating.

In the present invention, the mixing ratio of glass powder, $TiO_2$ powder, and a coloring pigment is determined as follows.

The mixing ratio of the glass powder is 30–94%, preferably, 50–80%. When the mixing ratio is less than 30%, flowability of the enamel coating is decreased. On the other hand, with the mixing ratio more than 94%, concealability is deteriorated so that the hue of the crystallized glass of a dark color is easily seen through the resultant enamel coating.

The mixing ratio of the $TiO_2$ powder is 5–69%, preferably, 15–40%. When the mixing ratio is less than 5%, it is difficult to obtain an effect of providing the concealability. On the other hand, with the mixing ratio more than 69%, the flowability of the enamel coating is deteriorated so that a desired pattern of the enamel coating is hardly obtained.

The mixing ratio of the coloring pigment is 0.05–34%, preferably, 1–20%. When the mixing ratio is less than 0.05%, it is difficult to stably obtain a desired hue. On the other hand, with the mixing ratio more than 34%, abrasion resistance and acid resistance are deteriorated.

When the enamel coating of a light color according to the present invention comprises the coloring pigment at a content greater than that of the TiO$_2$ powder, color development is excessive.

Preferably, the glass powder used in the enamel frit composition of the present invention is flowable at a low temperature, low in coefficient of thermal expansion, and excellent in abrasion resistance and acid resistance without containing any harmful component. More preferably, the glass powder consists essentially, by weight, of 45–75% SiO$_2$, 10–30% B$_2$O$_3$, 1–10% Al$_2$O$_3$, 1–10% BaO, 0–10% Na$_2$O, 0–5% K$_2$O, 0–5% Li$_2$O, and 0–2% F$_2$.

The reason why the glass powder having the above-mentioned composition is preferred is as follows:

When the content of SiO$_2$ is less than 45%, the acid resistance of the glass is degraded. In addition, the coefficient of thermal expansion is increased so that a too much difference in expansion is produced between the enamel coating and the low-expansion crystallized glass plate. In this event, the enamel coating is susceptible to frequent occurrence of cracks. With the content more than 75%, the flowability of the glass is decreased and the sinterability is reduced. As a result, the abrasion resistance of the enamel coating is degraded.

When the content of B$_2$O$_3$ is less than 10%, the flowability of the glass is deteriorated. With the content more than 30%, the coefficient of thermal expansion is excessively high.

When the content of Al$_2$O$_3$ is less than 1% or more than 10%, the flowability of the glass is deteriorated.

When the content of BaO is less than 1%, the flowability of the glass is deteriorated. With the content more than 10%, the coefficient of thermal expansion is excessively high.

Na$_2$O is an essential component to produce the enamel coating excellent in abrasion resistance. When Na20 is contained in borosilicate glass having the above-mentioned composition, the glass is greatly improved in flowability and is firmly sintered. Accordingly, the enamel coating having sufficient abrasion resistance can be obtained. When the content of Na$_2$O is more than 10%, however, the acid resistance is greatly decreased. Furthermore, such a large amount of Na$_2$O content is unfavorable because the coefficient of thermal expansion tends to be increased.

When the content of each of K$_2$O and Li$_2$O is more than 5%, the acid resistance is greatly decreased and the coefficient of thermal expansion tends to be increased.

When the content of F$_2$ is more than 2%, the flowability is changeable. It is therefore difficult to obtain the stable enamel coating.

The TiO$_2$ powder in the present invention serves to provide the enamel coating with the concealability and to improve the abrasion resistance. When the particle size of the TiO$_2$ powder is excessively large, however, the enamel coating often suffers occurrence of cracks or peel-off as well as color unevenness. In view of the above, an average particle size of TiO$_2$ powder is desired equal to 5 µm or less, preferably, equal to 1 µm or less. It is noted here that the average particle size is determined as a point providing the center of particle size distribution.

As the coloring pigment, use can be made of commercially-available pigments, for example, color oxides such as NiO (green), MnO$_2$ (black), CoO (black), Fe$_2$O$_3$ (dark brown), and Cr$_2$O$_3$ (green), oxides such as Cr—Al corumdum (pink), Sn—Sb—V rutile (gray), Ti—Sb—Ni rutile (yellow), and Zr—V zirconia (yellow), composite oxides such as Co—Zn—Al spinnel (blue), and Zn—Fe—Cr spinnel (brown), and silicates such as Ca—Cr—Si garnet (victoria green), Ca—Sn—Si—Cr sphene (pink), Zr—Si—Fe zirconium (salmon pink), Co—Zn—Si willemite (dark blue), and Co—Si olivine (dark blue).

In the present invention, the above-mentioned pigments are appropriately selected so that the enamel coating has a desired hue. For example, in order to obtain the enamel coating in beige, appropriate amounts of a yellow pigment and a brown pigment are mixed.

The enamel frit composition prepared in the above-mentioned manner has a coefficient of thermal expansion of about 20–70×10$^{-7}$/°C. within a temperature range between 30° and 380° C. The enamel coating can be formed by heat treatment at a temperature not higher than about 900° C.

Next, description will be made as regards a method of forming the enamel coating on the low-expansion crystallized glass plate by the use of the enamel frit composition according to the present invention.

At first, the glass powder, the TiO$_2$ powder, and the coloring pigment are mixed in a predetermined ratio and kneaded with a vehicle comprising a resin such as ethyl cellulose dissolved in a solvent such as terpineol to form a paste.

Next, a low-expansion crystallizable glass plate or the low-expansion crystallized glass plate is prepared. As the low-expansion crystallized glass plate, a Li$_2$O—Al$_2$O$_3$—Sio$_2$ crystallized glass plate having the coefficient of thermal expansion of about (–5)–30×10$^{-7}$/°C. within a temperature range of 30° and 750° C. is preferred.

As the low-expansion crystallized glass plate of a dark color, use is preferably made of a crystallized glass which consists, by weight, of 60–70% SiO$_2$, 14–28% Al$_2$O$_3$, 2.5–5.5% Li$_2$O, 0.1–2% MgO, 0.1–3% ZnO, 0–6% TiO$_2$, 0–3% ZrO$_2$, 0.03–0.5% V$_2$O$_5$, 0.1–2% Na$_2$O, 0–1% K$_2$O, 0–2% CaO, 0–3% BaO, and 0–3% PbO, contains precipitated solid solution crystals of β-quartz, and has a black appearance. This is because the above-mentioned crystallized glass is excellent in strength and thermal shock resistance and high in infrared percent transmission. Especially, the low-expansion crystallized glass of a dark color disclosed in JP-A-62182135 is preferred because the hue is thermally stable and is not changed when the enamel frit composition is baked.

As the low-expansion crystallizable glass plate, a raw glass for the low-expansion crystallized glass of a dark color disclosed in JP-A-62182135 is most preferred from the same reasons.

Thereafter, the paste is applied onto the surface of the low-expansion crystallizable glass plate or the low-expansion crystallized glass plate by screen printing or the like. It is necessary to carefully apply the paste so that the thickness of the enamel coating finally obtained falls within a range between 0.5 and 20 µm. Specifically, when the thickness of the enamel coating is more than 20 µm, the enamel coating is susceptible to occurrence of cracks. On the other hand, when the thickness is less than 0.5 µm, it is difficult to obtain the enamel coating of a desired hue.

Subsequently, baking is carried out at a temperature between 800° and 900° C. to obtain the low-expansion crystallized glass plate coated with the enamel coating comprising the glass component, the TiO$_2$ crystals, and the coloring pigment component.

When the low-expansion crystallizable glass plate is used, baking is carried out at a temperature between 750° and 900°

C. after the paste is applied onto the surface. Thus, a number of crystals are precipitated in the glass and the enamel coating is formed on the surface.

EXAMPLE

Tables 1 and 2 show samples Nos. 1–8 according to the present invention and comparative samples Nos. 9–10.

TABLE 1

| | Sample No. Examples | | | | |
|---|---|---|---|---|---|
| | 1 | 2 | 3 | 4 | 5 |
| Glass Powder Composition (wt %) | | | | | |
| $SiO_2$ | 65 | 60 | 55 | 55 | 65 |
| $B_2O_3$ | 20 | 22 | 25 | 25 | 20 |
| $Al_2O_3$ | 5 | 6 | 7 | 7 | 5 |
| BaO | 3 | 4 | 5 | 5 | 3 |
| $Na_2O$ | 7 | 5 | 3 | 5 | 7 |
| $K_2O$ | — | 1 | 3 | 1 | — |
| $Li_2O$ | — | 1 | 1 | 1 | — |
| $F_2$ | — | 1 | 1 | 1 | — |
| Mixing Ratio (wt %) | | | | | |
| Glass Powder | 60 | 71 | 78 | 69 | 70 |
| $TiO_2$ Powder | 30 | 18 | 20 | 25 | 20 |
| Yellow Pigment | 8 | 6 | 1 | 3 | 5 |
| Brown Pigment | 2 | 5 | 1 | 3 | 5 |
| Coefficient of Thermal Expansion ($\times 10^{-7}/°C.$) | 32 | 40 | 44 | 40 | 41 |
| Concealability | ○ | ○ | ○ | ○ | ○ |
| Hue | beige | beige | beige | beige | beige |

TABLE 2

| | Sample No. | | | | |
|---|---|---|---|---|---|
| | Examples | | | Comparative Examples | |
| | 6 | 7 | 8 | 9 | 10 |
| Glass Powder Composition (wt %) | | | | | |
| $SiO_2$ | 50 | 60 | 70 | 65 | 60 |
| $B_2O_3$ | 28 | 21 | 15 | 20 | 22 |
| $Al_2O_3$ | 8 | 7 | 4 | 5 | 6 |
| BaO | 5 | 3 | 2 | 3 | 4 |
| $Na_2O$ | 4 | 6 | 6 | 7 | 5 |
| $K_2O$ | 2 | 2 | 1 | — | 1 |
| $Li_2O$ | 2 | 1 | 2 | — | 1 |
| $F_2$ | 1 | — | — | — | 1 |
| Mixing Ratio (wt %) | | | | | |
| Glass Powder | 56 | 53 | 51 | 83 | 85 |
| $TiO_2$ Powder | 35 | 40 | 40 | 3 | — |
| Yellow Pigment | 7 | 6 | 5 | 7 | 8 |
| Brown Pigment | 2 | 1 | 4 | 7 | 7 |
| Coefficient of Thermal Expansion ($\times 10^{-7}/°C.$) | 30 | 29 | 28 | 46 | 49 |
| Concealability | ○ | ○ | ○ | △ | X |
| Hue | beige | beige | beige | brown | brown |

Each sample in Tables 1 and 2 was prepared as follows:

A glass material was prepared to have a composition specified in Tables. The glass material was melted at a temperature between 1400° and 1500° C. for 10–15 hours, formed into a film shape, pulverized by a ball mill, and classified to obtain glass powder having an average particle size of 5 μm. The glass powder was mixed with $TiO_2$ powder (having an average particle size of 0.5 μm) and a commercially-available coloring pigment to obtain each sample. As the coloring pigment, a combination of a yellow pigment (TiO$_2$—Sb$_2$O$_3$—NiO rutile) and a brown pigment (ZnO-Fe$_2$O$_3$—Cr$_2$O$_3$ spinnel) was used. Both of these coloring pigments were the products supplied by Ferro Enamels (Japan) Limited under the trade name "Ferro Color".

Subsequently, each sample and a vehicle comprising ethyl cellulose dissolved in terpineol were kneaded at a weight ratio of 2.6:1 to form a paste. The paste was applied onto the surface of the low-expansion crystallized glass plate for each of the samples Nos. 1–3 and onto the surface of the low-expansion crystallizable glass plate for each of the samples Nos. 4–10 by screen printing.

Use was made of the low-expansion crystallizable glass plate consisting, by weight, of 66% $SiO_2$, 23% $Al_2O_3$, 4% $Li_2O$, 0.5% MgO, 0.3% ZnO, 5% $TiO_2$, 0.2% $V_2O_5$, 0.5% $Na_2O$, and 0.5% $K_2O$, and having a size of 50×50× 4 mm. The low-expansion crystallized glass plate was obtained by heat-treating the above-mentioned low-expansion crystallizable glass plate to precipitate the solid solution crystals of β-quartz and had the coefficient of thermal expansion of $-3 \times 10^{-7}/°C.$ within a temperature range between 30° and 750° C.

Thereafter, the glass plate was subjected to heat treatment at a temperature between 750° and 900° C. to obtain an enamel-coated low-expansion crystallized glass plate coated with an enamel coating of a hue specified in Tables. A measured thickness of this enamel coating is 5–7 μm.

Then, measurement was made about the coefficient of thermal expansion of the enamel coating formed on the surface of the low-expansion crystallized glass plate. In addition, the concealability was evaluated and the hue was observed. The results are shown in the Tables.

As apparent from Tables, the enamel coating using each of the samples Nos. 1–8 according to the present invention had the coefficient of thermal expansion as low as 28–44× $10^{-7}/°C.$ within a temperature between 30° and 380° C., was excellent in concealability, and had the hue of beige.

On the other hand, the enamel coatings using the comparative samples Nos. 9 and 10 had low coefficients of thermal expansion equal to $46 \times 10^{-7}/°C.$ and $49 \times 10^{-7}/°C.$, respectively, but were poor in concealability and had the hue of brown.

The coefficient of thermal expansion was measured in the following manner. Each sample was press-formed into a square bar, and baked at a temperature of 850° C. to form a baked product. The baked product was measured by the use of a differential detection relative dilatometer. The concealability was evaluated by visually observing the enamel coating. In Tables, ○, △, and x represent the conditions that the hue of the crystallized glass is not seen at all, slightly seen through the enamel coating, and considerably clearly seen through the enamel coating, respectively.

As described above, if the enamel coating is formed on the surface of the low-expansion crystallized glass of a dark color by the use of the enamel frit composition according to the embodiment of the present invention, the hue of the crystallized glass is not seen through the enamel coating even if the enamel coating is thin in thickness and light in color.

What is claimed is:

1. An enamel-coated low-expansion crystallized glass plate comprising a low-expansion crystallized glass plate covered with an enamel coating, wherein said enamel coating consists essentially of, by weight, of about 30–94 wt % glass component, 5–69 wt % $TiO_2$ crystals, and 0.05–34 wt % coloring pigment component, said glass component consisting essentially of, by weight, of about 45–75% $SiO_2$, 10–30% $B_2O_3$, 1–8% $Al_2O_3$, 1–10% BaO, 0–10% $Na_2O$, 0–5% $K_2O$, 0–5% $Li_2O$, and 0–2% $F_2$.

2. An enamel-coated low-expansion crystallized glass plate as claimed in claim 1, wherein the content of said $TiO_2$ crystals is greater than that of said coloring pigment component.

3. An enamel-coated low-expansion crystallized glass plate as claimed in claim 1, wherein said low-expansion crystallized glass plate consists essentially, by weight, of 60–70% $SiO_2$, 14–28% $Al_2O_3$, 2.5–5.5% $Li_2O$, 0.1–2% MgO, 0.1–3% ZnO, 0–6% $TiO_2$, 0–3% $ZrO_2$, 0.03–0.5% $V_2O_5$, 0.1–2% $Na_2O$, 0–1% $K_2O$, 0–2% CaO, 0–3% BaO, and 0–3% PbO, contains precipitated solid solution crystals of β-quartz, and has a black appearance.

4. An enamel-coated low-expansion crystallized glass plate as claimed in claim 1, wherein said low-expansion crystallized glass plate consists essentially, by weight, of 60–70% $SiO_2$, 14–28% $Al_2O_3$, 2.5–5.5% $Li_2O$, 0.1–0.9% MgO, 0.1–0.9% ZnO, 3–6% $TiO_2$, 0.03–0.5% $V_2O_5$, 0.1–1% $Na_2O$, 0–1% $K_2O$, 0–2% CaO, 0–2% BaO, and 0–3% PbO, contains precipitated solid solution crystals of β-quartz, and has a black appearance.

* * * * *

UNITED STATES PATENT AND TRADEMARK OFFICE
CERTIFICATE OF CORRECTION

PATENT NO. : 5,776,613
DATED : July 7, 1998
INVENTOR(S) : Narutoshi Shimatani et al.

It is certified that error appears in the above-identified patent and that said Letters Patent is hereby corrected as shown below:

On the title page, item
[30] Foreign Application Priority Data, add

| Japanese Application No. | Date of Filing |
|---|---|
| -- 309,961 | November 2, 1995 |
| 329,597 | November 24, 1995 -- |

Signed and Sealed this

Eighth Day of December, 1998

Attest:

BRUCE LEHMAN

Attesting Officer

Commissioner of Patents and Trademarks